April 29, 1952 T. T. SCOTT 2,594,687
SPREADER FOR CHEMICAL FERTILIZER MATERIAL HAVING
SPIRAL ELEMENTS FOR MANIPULATING THE MATERIAL
Filed April 26, 1948 3 Sheets-Sheet 1
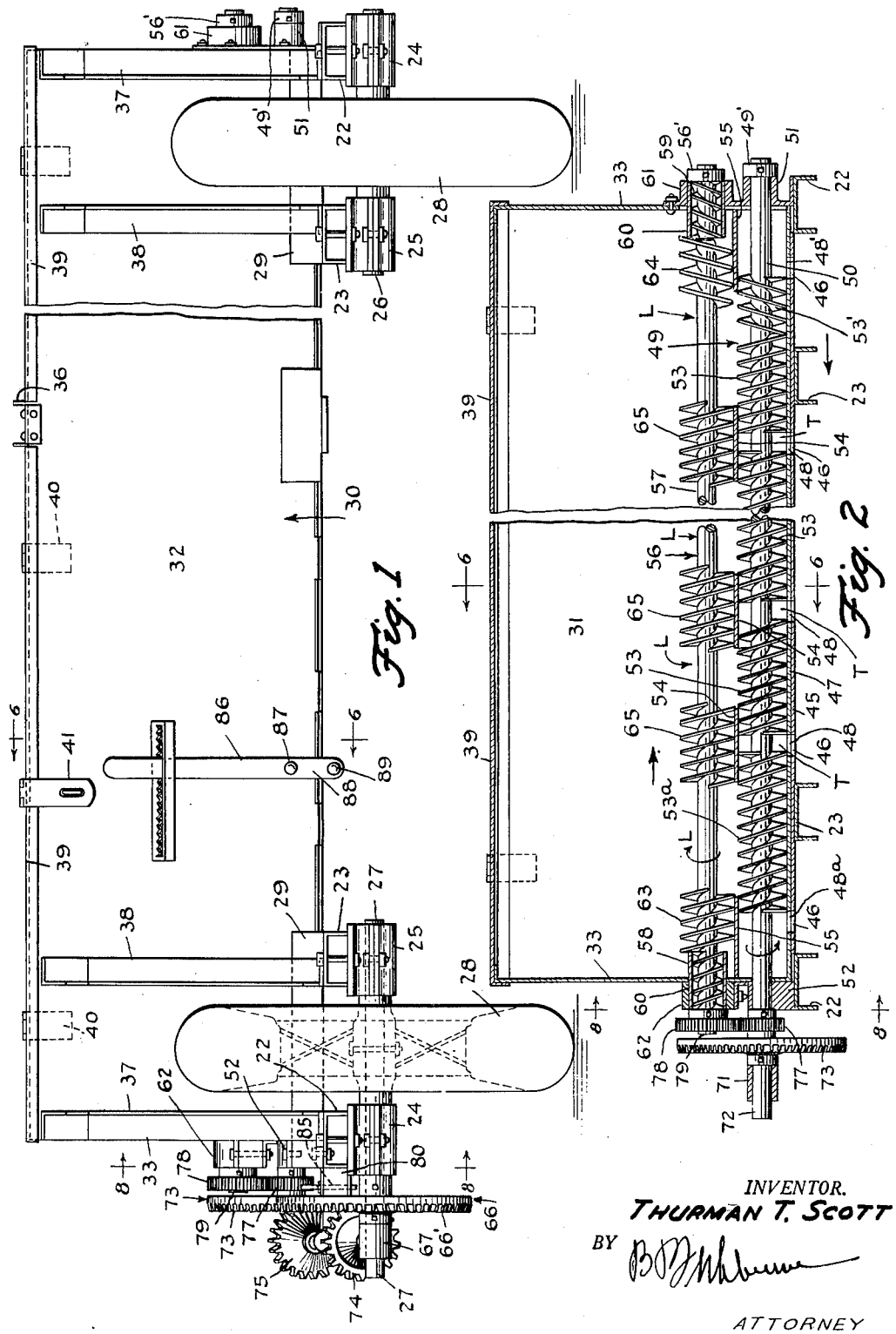
INVENTOR.
THURMAN T. SCOTT
BY
ATTORNEY

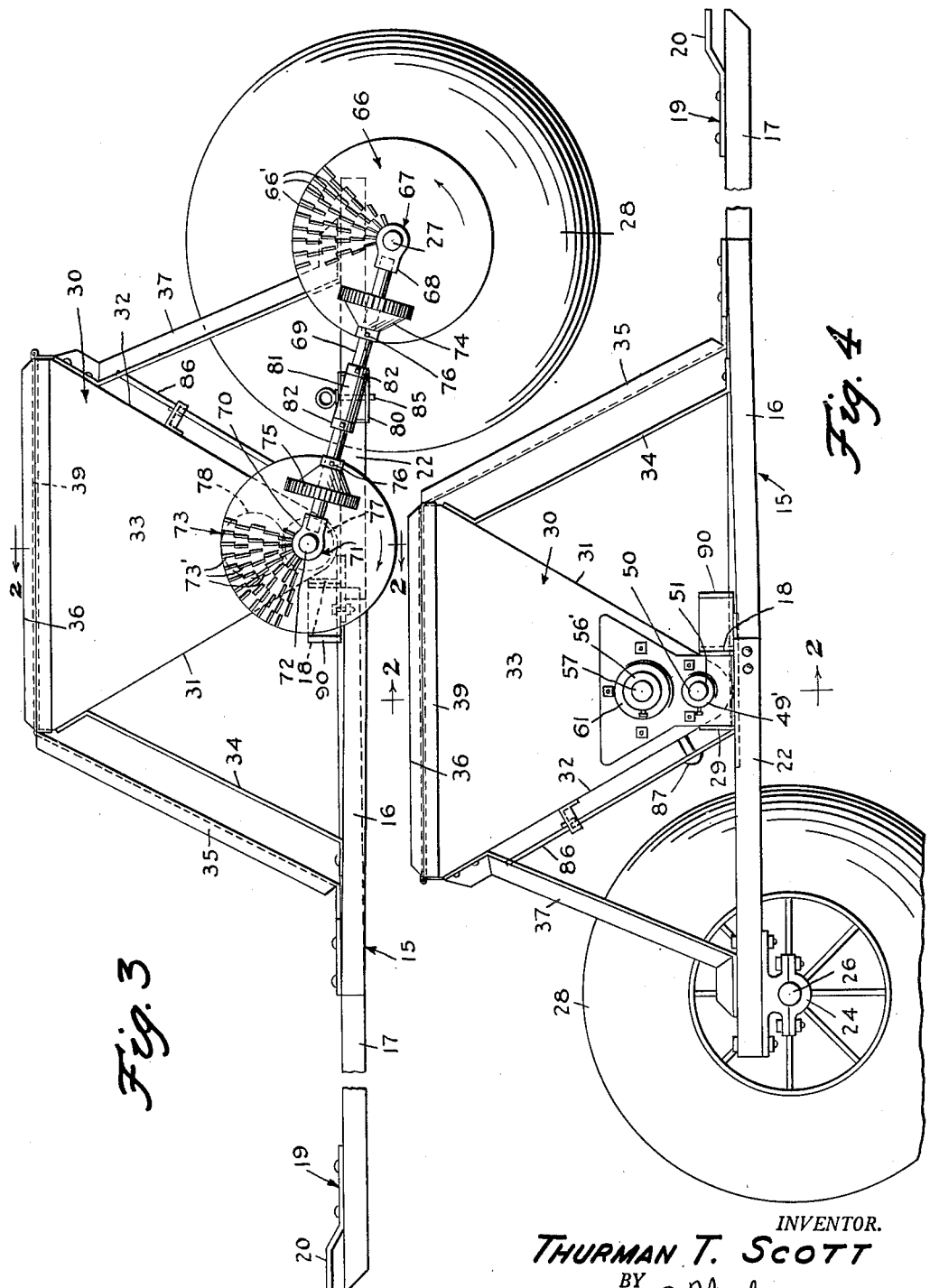

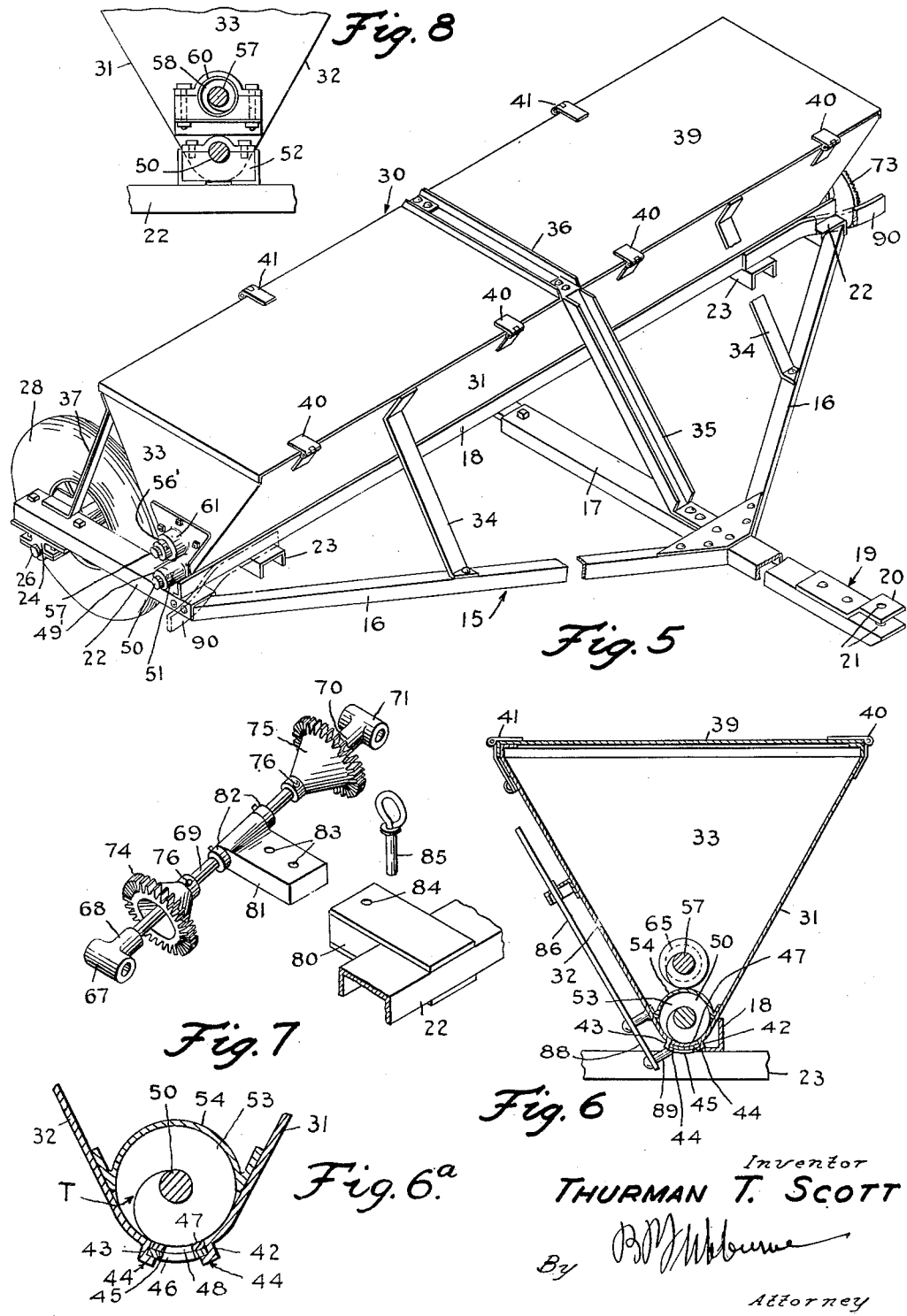

Patented Apr. 29, 1952

2,594,687

UNITED STATES PATENT OFFICE 2,594,687

SPREADER FOR CHEMICAL FERTILIZER MATERIAL HAVING SPIRAL ELEMENTS FOR MANIPULATING THE MATERIAL

Thurman T. Scott, Thomasville, Ga.

Application April 26, 1948, Serial No. 23,361

3 Claims. (Cl. 222—238)

My invention relates to improvements in traversing spreaders.

An important object of the invention is to provide a traversing spreader which is particularly well-adapted for spreading chemical fertilizer, small grain, and the like, and which is so constructed that the finely divided material is positively fed, whereby the fertilizer will not become clogged or block the discharge openings in the hopper, while the machine is in operation.

A further object of the invention is to provide a close fit between the feed auger and the hopper so that the chemical fertilizer, or the like, is positively fed by the auger and cannot accumulate in proximity thereto.

A further object of the invention is to provide a fertilizer spreader wherein large discharge openings are provided in the hopper, and the rate of discharge of the fertilizer material is controlled by varying the speed of the rotary member or auger, and not by varying the sizes of the discharge openings.

A further object of the invention is to provide a fertilizer spreader designed so that the bearings for the feeding and agitating augers are protected from contact with the corrosive fertilizer in the hopper.

A further object is to provide a traversing spreader having means to prevent the material within the hopper from sifting out of the same, when the spreader is stationary and the discharge openings are uncovered.

A further object is to provide a traversing spreader having means to prevent fertilizer from accumulating at the ends of the hopper, and to cause this fertilizer near such ends to be properly spread upon the ground.

A still further object of the invention is to provide a traversing spreader of the above mentioned type which is simplified, durable, and relatively inexpensive to build.

Other objects and advantages of the invention will be apparent during the course of the following description.

In the accompanying drawings, forming a part of this application, and in which like numerals are employed to designate like parts throughout the same, Figure 1 is a rear elevation of a traversing spreader embodying my invention, Figure 2 is a vertical transverse section taken on line 2—2 of Figure 3, Figure 3 is an end elevation of the spreader, Figure 4 is the opposite end elevation of the same, Figure 5 is a front perspective view of the spreader, Figure 6 is a vertical section taken on line 6—6 of Figure 2, parts omitted, Figure 6a is an enlarged fragmentary section showing the discharge openings at the bottom of the hopper, Figure 7 is an exploded perspective view of a gear transmission mechanism, and, Figure 8 is a vertical section taken on line 8—8 of Figure 1, parts omitted.

In the drawings, where for the purpose of illustration is shown a preferred embodiment of the invention, the numeral 15 designates a horizontal frame comprising forwardly converging frame members or sides 16, rigidly connected at their forward ends to a longitudinal draw bar 17, arranged at the transverse center of the spreader. The draw bar 17 extends rearwardly, and is rigidly connected at its rear end to a horizontal transverse brace or beam 18. The draw bar 17 also extends forwardly of the beams 16, and is provided near its forward end with a tractor hitch plate 19, rigidly mounted upon the draw bar, and including an upwardly offset portion 20 disposed above the draw bar. The offset portion 20 and draw bar are provided with aligned openings 21 to receive a pin or the like for connecting the traversing spreader to a tractor. The rear ends of sides 16 are arranged adjacent to the outer ends of the beam 18, and are suitably rigidly connected to the forward ends of outer longitudinal wheel frame supports 22. The outer ends of beam 18 also are rigidly mounted upon the forward end of longitudinal supports 22. Spaced laterally inwardly from the outer supports 22 are parallel longitudinal inner supports 23, rigidly connected at their forward ends to the transverse beam 18, as shown. The supports 22 and 23 extend rearwardly from beam 18 and are provided near their rear ends with outer and inner depending bearings 24 and 25, rigidly secured to the bottoms of supports 22 and 23. Journaled within the bearings 24 and 25 are horizontal axles 26 and 27 upon which are mounted for rotation therewith pneumatic tired wheels 28. The wheels 28 are arranged between the longitudinal supports 22 and 23 and rearwardly of the beam 18, as shown. Spaced rearwardly of the transverse beam 18 and parallel to the same are short horizontal transverse braces 29, rigidly mounted upon the supports 22 and 23 and extending across the same.

Mounted upon the supports 22 and 23, and extending for substantially the full width of the frame 15, is an elongated V-shaped hopper 30, including downwardly converging inclined sides 31 and 32 and ends 33 adjacent to the outer supports 22. The narrow bottom portion of the hopper 30 is arranged between the transverse beam 18 and the short transverse braces 29, and these members prevent the lower end of the hopper 30 from moving forwardly or rearwardly. Rigidly connected with the forward side 31 of the hopper are inclined braces 34, which extend downwardly and are rigidly secured to the beams 16, as shown. A centrally inclined brace 35 is rigidly secured at its lower end to the draw bar 17, and at its upper end to a central longitudinal strap or bar 36 which extends rearwardly across the top of the hopper, and is rigidly secured thereto. Upstanding forwardly inclined braces 37 and 38 are rigidly connected at their upper ends to the rear side 32, and at their lower ends to supports 22 and 23 respectively, above axles 26 and 27. It may thus be seen that the hopper 30 is supported by a wheeled frame, and is adequately braced. The hopper is provided with a pair of hinged covers 39, disposed upon opposite sides of the strap 36 and hinged to the forward side 31, by means of hinges 40. The rear edges of covers 39 carry hasps 41, or the like. At its bottom, the hopper 30 is provided with depending longitudinal flared extensions or guides 42 and 43, carrying inwardly projecting longitudinal flanges 44 which extend for the full length of the hopper. Arranged to slide longitudinally upon the flanges 44 is an elongated transversely curved plate or valve element 45 provided with a plurality of longitudinally spaced rectangular discharge openings 46. These discharge openings 46 are preferably about one inch by two inches, although their size may vary. The discharge openings 46 are preferably spaced about six inches apart, and this spacing may be varied. Arranged above the slidable plate 45 is a stationary transversely curved plate or bottom 47, rigidly secured between flared extensions 43, as shown, and forming the bottom of the hopper. The bottom 47 is provided with spaced rectangular end discharge openings 48a and 48' and intermediate discharge openings 48, all of which openings are identical with the openings 46, and adapted to register with the openings 46.

Arranged within the hopper 30, close to the bottom 47, and extending longitudinally of the hopper is a rotatable fertilizer feed auger 49, which is cylindrical. The bottom 47 is semi-cylindrical in cross-section, and the auger has an accurate slidable fit within the bottom. The auger substantially slidably contacts with this bottom and the lower portion of the auger will positively feed all of the chemical fertilizer which it engages. This feed auger 49 comprises a shaft 50 journaled at its opposite ends in bearings 51 and 52, which are arranged outwardly of hopper ends 33 and are rigidly mounted upon the outer supports 22. The shaft 50 is provided with intermediate spiral vane sections 53 and the intermediate spiral vane sections are right-hand. The intermediate spiral vane sections 53 are disposed between the discharge openings 48, Figure 2. The shaft 50 is provided with end spiral vane sections 53a and 53'. The spiral vane section 53a is right hand to feed the material to the left, Figure 2, and is arranged between the end discharge opening 48a and the next intermediate discharge opening 48. The spiral vane section 53' is left hand to feed the material to the right to the end discharge opening 48', and the next intermediate spiral vane section 53 contacts with the end spiral vane section 53'. Directly above each intermediate discharge opening 48 the shaft 50 has no spiral vane, so that a longitudinal gap T is provided between adjacent sections 53 of the spiral vane. The end spiral vane section 53a and the intermediate spiral vane sections 53 feed the fertilizer to the left, while the end spiral vane section 53' feeds it to the right. The end spiral vane section 53a feeds the chemical fertilizer to the end opening 48a, the intermediate spiral vane sections 53 feed the chemical fertilizer to the intermediate openings 48, while the end spiral vane section 53' feeds the chemical fertilizer to the end opening 48'. These spiral vane sections 53a, 53 and 53' terminate substantially at the ends of the adjacent discharge openings, and therefore cannot feed the material beyond the opposite ends of such openings. Adjacent to and above each gap T is a cylindrically curved cover or shield 54, see particularly Figure 6a, and this shield is rigidly secured to the sides 31 and 32. The shields 54 extend over the ends of the spiral vane sections 53a and 53, and form with the bottom 47 cylindrical tubes, substantially slidably receiving the auger sections. Cylindrically curved end shields 55 are provided adjacent to the hopper ends 33, and correspond to the shields 54, and these shields 55 overlap the outer portions of the spiral vane section 53a and spiral vane section 53', Figure 2. The shields 55 form with the bottom 47 cylindrical tubes, slidably receiving the end spiral vane sections 53a and 53'. It is thus seen that a shield extends over each discharge opening, so that the material can be fed to the discharge opening only through the action of the auger section.

Arranged for rotation directly above the feed auger 49 is a combined agitating and feed auger 56 including a shaft 57. The diameter of this feed auger may be varied considerably, and I contemplate having it sufficiently large to extend close to the sides of the hopper. Formed upon the shaft 57 at its outer end portions are small spiral vanes 58 and 59, which are right-hand and left-hand vanes, and which are adapted to serve as bearings for the shaft 57 and also as means to expel the fertilizer inwardly, from the ends 33 of the hopper. The spiral vanes 58 and 59 are journaled in short bearing tubes 60, which extend through the ends 33, and are secured in bearings 61 and 62. The bearing 61 is formed integral with the bearing 51, and is rigidly secured to the adjacent end 33, as shown. The bearing 62 is rigidly secured to the adjacent end 33 of the hopper. Inwardly of the tubes 60, the shaft 57 is provided with spiral vane sections 63 and 64, included in the auger. These spiral vane sections 63 and 64 are disposed directly above the end shields 55. The spiral vane section 63 is formed with a right-hand helix, while the spiral vane section 64 is formed with a left-hand helix, so that these spiral vane sections feed the fertilizer inwardly from the ends 33. Formed upon the shaft 57, directly above the shields 54 are spiral vane sections 65, all of which are formed from a right-hand helix. The spiral vane sections of the auger 56 are spaced to provide gaps L, arranged above the uncovered portions of the spiral vane sections of feed auger 49, Figure 2.

Means are provided to drive the augers 49 and 56, such means including the axle 27. Mounted upon the axle 27 for rotation therewith and arranged outwardly of the adjacent bearing 24 is a multi-gear 66, provided with a plurality of concentric annular groups of gear teeth 66', arranged upon the outer vertical face of the multi-gear 66. Arranged outwardly of the multi-gear 66, and mounted upon the outer end of the shaft 27 is a T-shaped floating bearing 67, including a longitudinal extension 68, which projects forwardly. Journaled within the bearing extension 68 is a rotatable shaft 69, which extends forwardly and generally longitudinally of the spreader, and is journaled at its forward end within a rearwardly projecting extension 70 of a T-shaped bearing 71. The T-shaped bearing 71 is mounted upon an outer extension 72 of the feed auger shaft 50, and the extension 72 is rotatable within the T-shaped bearing 71. A multi-gear 73 is securely mounted upon the extension 72 for rotation therewith and arranged outwardly of the bearing 52, as shown. This multi-gear 73 has concentric annular groups of teeth 73', as shown. Forward and rear pinions 74 and 75 are mounted upon the shaft 69, for rotation therewith and are equipped with set screws 76, which engage a flat surface on the shaft 69, and also permit the longitudinal adjustment of the pinions 74 and 75 upon the shaft 69. The pinions 74 and 75 are adapted to mesh with the multi-gears 66 and 73 respectively, and are adjustable to engage any of the annular groups of teeth 66' and 73', upon the multi-gears to vary the speed of rotation of the augers 49 and 56. Mounted upon the extension 72 for rotation therewith and arranged between multi-gear 73 and bearing 52 is a gear 77, and this gear meshes with and drives a gear 78, mounted upon an outer extension 79 of the auger shaft 57. The gear 78 is arranged above the gear 77 and between the multi-gear 73 and bearing 62, as shown. Means are provided to adjust the shaft 69 carrying pinions 74 and 75 into and out of mesh with and from multi-gears 66 and 73. Such means includes a rectangular tubular socket 80, rigidly secured to the adjacent support 22, between the multi-gears 66 and 73, and projecting laterally outwardly from the support 22, Figure 7. Rotatably attached to the rotatable shaft 69 is a rectangular block 81, which is held against longitudinal movement along shaft 69 by set collars 82. The block 81 is adapted to engage within the socket 80, and is provided with a pair of spaced apertures 83, both adapted to register with an aperture 84 in the socket 80. A pin 85 is provided to hold the block 81 within the socket 80, when either of the apertures 83 is in registration with the aperture 84. When the innermost aperture 83 registers with the aperture 84, and the pin 85 is inserted, the pinions 74 and 75 are held out of mesh with multi-gears 66 and 73. When the outermost aperture 83 registers with the aperture 84, and the pin 85 is inserted, the pinions 74 and 75 mesh with multi-gears 66 and 73. It is thus seen that the shaft 69 and associated elements constitute an adjustable gear transmission.

A lever 86 is arranged adjacent to the rear side 32 of the hopper and is pivotally connected to the side 32, as at 87. This lever 86 includes a depending extension 88, connected through a pin 89 with the sliding plate 45. The lever 86 may be swung about its pivot 87 to shift the plate 45 longitudinally to open and close the discharge openings 48. It should be mentioned here that lever 86 is not used to control the passage of the fertilizer through the openings 48 and 46, but merely to open and close these discharge openings. For example, it may be desirable to completely close the discharge openings when the traversing spreader is not being used, in order to keep dampness out of the hopper.

Suitable guards or bumpers 90 may be provided and rigidly secured to the transverse brace 18. These bumpers project laterally outwardly for a slight distance beyond the ends of the hopper 30 and serve to protect the bearings 51 and 61, and the driving mechanism, including the multi-gear 73, from objects which might strike against those elements as the spreader is pulled forwardly by the tractor.

Particular attention is called to the fact that the spaced discharge openings 48a, 48 and 48' are arranged in a group extending longitudinally of the hopper. The end discharge openings 48a and 48' are spaced from the ends 33 of the hopper and the bearings carried thereby. The intermediate spiral vane sections 53 are arranged between the discharge openings 48 and the gaps T between the spiral vane sections 53 are in alignment with the discharge openings. The spiral vane sections 53 terminate substantially at the ends of the discharge openings and cannot feed the material across the same. The end spiral vane sections 53a and 53' terminate at the ends of the end openings 48a and 48' respectively, which are spaced from the ends of the hopper. The shields cover the discharge openings and overlap the ends of the spiral vane sections and are arranged in a group extending longitudinally of the hopper. The intermediate spiral vane sections 65 terminate substantially at the opposite ends of the shields 54, while the end spiral vane sections 63 and 64 terminate substantially at the inner ends of the end shields 55. The spiral vane sections 63, 64 and 65 are arranged in a group extending longitudinally of the hopper. The arrangement is such that the material is fed to discharge openings solely through the medium of the spiral vane sections. When the machine is at rest and the discharge openings entirely uncovered, there is no tendency for the material wasting through the discharge openings. A peculiarity of chemical fertilizer is that when it is continuously rubbed in contact with moving metal parts, without being discharged, that such fertilizer becomes caked or hardened. This factor causes most of the trouble in the operation of the conventional spreader. Since the spiral vane sections of my feed auger 49 positively advance the artificial fertilizer, without prolonged or undue rubbing action therewith, the difficulty is overcome. The fertilizer is continuously advanced and there is no repeated frictional engagement or rubbing action between the fertilizer and the spiral vane sections.

The operation of the traversing spreader is as follows:

The hopper 30 is of course filled with fertilizer, and the draw bar 17 is connected to the tractor. As the spreader is pulled forwardly by the tractor, the wheel 28, mounted on shaft 27, causes multi-gear 66 to rotate counterclockwise, Figure 3. The block 81 is arranged in the innermost position and the pinions 74 and 75 are in mesh with the multi-gears 66 and 73. The multi-gear 73 rotates clockwise, Figure 3. and the feed auger 49 likewise turns clockwise. The gear 78 rotates counterclockwise, driving the combined agitating and feeding auger 56 in a counterclockwise direction, Figure 3. The fertilizer in the hopper 30 is fed by the feed auger 49 generally to the left, Figure 2, as indicated by the arrow. The fertilizer thus moving to the left by the action of the spiral vane sections 53 discharges through the registered discharge openings 48 and 46. The gaps T between the spiral vane sections 53 prevent any tendency of the fertilizer to be fed beyond the discharge openings 48. The end spiral vane section 53a moves the fertilizer to the left, Figure 2, and discharges it through the opening 48a. The end spiral vane section 53' causes the fertilizer at the right hand end of the hopper, Figure 2, to move to the right and to discharge through the end opening 48'. Because of the gaps at the ends of the feed auger 49, beneath the end shields 55, there is no tendency for the fertilizer to be fed into contact with bearings 51 and 52, and the end shields 55 themselves prevent fertilizer from getting into these bearings. This feature is important because chemical fertilizers are highly corrosive, and will quickly bind bearings with which they come into contact. As the combined agitating and feeding auger 56 rotates, the fertilizer near and above it is moved generally to the right, Figure 2, as shown by the arrow, except that the fertilizer at the right hand end of the hopper is fed to the left by the left hand spiral vane section 64. The fertilizer around and above the auger 56 is continuously agitated and broken up by the auger, and when it is fed to the gaps L between the spiral vane sections 63, 64 and 65, it falls through onto the exposed portions of the spiral vane sections 53a, 53 and 53' of the feed auger 49. This continuous operation provides a steady and even feeding of the fertilizer to the discharge openings 48a, 48, 48' and 46, and there is no clogging of the openings. The small spiral vanes 58 and 59 within the bearing tubes 60 serve to prevent any fertilizer from coming into contact with the inner bearing surfaces of the tubes 60, by expelling the fertilizer inwardly and away from the tubes 60. The augers 49 and 56 are held against end movement by set collars 49' and 56'.

The rate of discharge of the fertilizer from the spreader is controlled entirely by varying the speed of rotation of the augers 49 and 56, and not by varying the size of the discharge openings 48a, 48 and 48'. The speeds of the augers 49 and 56 are varied by adjusting the pinions 74 and 75 along the shaft 69. A wide number of combinations of speeds may be obtained through the multi-gears 66 and 73.

The traversing spreader is extremely simple to adjust and operate, and constitutes a distinct improvement over present types of spreaders, where the discharging of fertilizer is controlled by varying the size of the discharge openings in the hopper. Clogging and matting of the fertilizer is a common difficulty in this latter type of hopper.

It is very easy to disassemble the spreader for cleaning the same. The shaft 69 is removable bodily with its associated elements and the augers 49 and 56 may be removed through the right end 33, Figure 2.

It is to be understood that the form of my invention herewith shown and described is to be taken as a preferred example of the same and that various changes in the shape, size and arrangement of parts, may be resorted to without departing from the spirit of my invention or the scope of the subjoined claims.

Having thus described my invention, I claim:

1. A traversing spreader for chemical fertilizer or the like, comprising a hopper to be moved over the ground, said hopper including ends and a transversely curved bottom, said bottom being provided with end discharge openings, which are spaced inwardly and horizontally from such ends, said bottom being provided with intermediate discharge openings which are spaced horizontally from each other and from the end openings, bearings mounted upon the ends of the hopper and spaced horizontally from the end discharge openings, a substantially horizontal shaft extending through the hopper and having its ends held within the bearings, end spiral vane sections mounted upon the shaft and having their outer ends terminating substantially at the inner sides of the end discharge openings which are remote from the bearings, said end spiral vane sections being oppositely pitched to feed the material outwardly, intermediate spiral vane sections mounted upon the shaft and horizontally spaced from each other, one intermediate spiral vane section being spaced from the next end spiral vane section, the spacing of the spiral vane sections providing gaps, said gaps being in substantial alignment with the intermediate discharge openings, the intermediate spiral vane sections having their discharge ends terminating substantially at the adjacent sides of the intermediate discharge openings, imperforate end shields extending from the ends of the hopper and arranged above the shaft and extending inwardly beyond the end discharge openings, the end shields being transversely curved and forming with the transversely curved bottom of the hopper cylindrical tubes, the outer ends of the end spiral vane sections extending into the ends of the tubes and substantially contacting therewith, intermediate imperforate shields arranged within the hopper and spaced horizontally from the end shields and from each other and disposed over the gaps, the intermediate shields being transversely curved and forming with the transversely curved bottom of the hopper intermediate cylindrical tubes, the ends of the intermediate spiral vane sections and of one end spiral vane section extending into the intermediate tubes and substantially contacting therewith, and means to rotate the shaft.

2. A traversing spreader for chemical fertilizer or the like, comprising a hopper to be moved over the ground, said hopper including ends and a transversely curved bottom, said bottom being provided with end discharge openings which are spaced inwardly and horizontally from the ends of the hopper, said bottom being provided with intermediate discharge openings spaced horizontally from each other and from the end openings, bearings mounted upon the ends of the hopper and horizontally spaced from the end openings, a substantially horizontal shaft extending through the hopper and having its ends held within the bearings, an end spiral vane section mounted upon the shaft and having its outer end terminating substantially at the side of the next end discharge opening which side is remote from the bearing, intermediate spiral vane sections mounted upon the shaft and longitudinally spaced from each other, one intermediate spiral vane section being longitudinally spaced from the end spiral vane section, the spacing of the spiral vane sections providing gaps, said gaps being in substantial alignment with the intermediate discharge openings, the intermediate spiral vane sections being pitched in the same direction with the end spiral vane section, the intermediate spiral vane sections having their discharge ends terminating substantially at the sides of intermediate discharge openings which are remote from the end spiral vane section, a second end spiral vane section mounted upon the shaft and oppositely pitched with respect to the first-named end spiral vane section and having its discharge end terminating substantially at that side of the next end discharge opening which side is remote from the other end of the hopper and bearing, imperforate end shields extending from the ends of the hopper and arranged above the shaft and extending inwardly beyond the end discharge openings, the end shields being transversely curved and forming with the transversely curved bottom of the hopper cylindrical outer tubes, the outer ends of the end spiral vane sections extending into the ends of the outer tubes and substantially contacting therewith, imperforate intermediate shields arranged within the hopper and spaced horizontally from the end shields and from each other and disposed over the gaps, the intermediate shields being transversely curved and forming with the transversely curved bottom of the hopper intermediate cylindrical tubes, the inner end of the first-named end spiral vane section extending into the end of the adjacent intermediate tube and the intermediate spiral vane sections having their ends extending into the intermediate tubes, all vane sections substantially contacting with said tubes into which they extend, and means to rotate the shaft.

3. A traversing spreader for chemical fertilizer or the like, comprising a hopper to be moved over the ground, said hopper including ends and a transversely curved bottom, said bottom being provided with end discharge openings which are spaced inwardly and horizontally from the ends of the hopper, said bottom being provided with intermediate discharge openings spaced horizontally from each other and from the end openings, bearings mounted upon the ends of the hopper and horizontally spaced from the end openings, a substantially horizontal shaft extending through the hopper and having its ends held within the bearings, an end spiral vane section mounted upon the shaft and having its outer end terminating substantially at the side of the next end discharge opening which side is remote from the bearing, a second end spiral vane section mounted upon the shaft and pitched in an opposite direction to the pitch of the first-named end spiral vane section, the second end spiral vane section having its outer end terminating substantially at the side of the other end discharge opening which side is remote from the bearing, intermediate spiral vane sections mounted upon the shaft and longitudinally spaced from each other, one intermediate spiral vane section being spaced from the next end spiral vane section, the spacing of the spiral vane sections providing gaps, said gaps being in substantial alignment with the discharge openings, the intermediate spiral vane sections being pitched in the same direction with the first-named end spiral vane section, the second end spiral vane section having its inner end substantially contacting with the take up end of the next intermediate spiral vane section, the intermediate spiral vane sections having their discharge ends terminating substantially at the sides of the intermediate discharge openings remote from the first-named end spiral vane section, imperforate end shields extending from the ends of the hopper and arranged above the shaft and extending inwardly beyond the end discharge openings, the shields being transversely curved and forming with the transversely curved bottom of the hopper end cylindrical tubes, the outer end of the first-named end spiral vane section extending into one end tube and substantially contacting therewith and the outer part of the second-named end spiral vane section extending into the other end tube, imperforate intermediate shields arranged within the hopper and spaced horizontally from the end shields and from each other and disposed above the gaps, the intermediate shields being transversely curved and forming with the transversely curved bottom of the hopper intermediate cylindrical tubes, the inner end of the first named end spiral vane section extending into one intermediate tube and the intermediate spiral vane sections extending into the intermediate tubes, the spiral vane sections substantially contacting with the intermediate tubes into which they extend, means to rotate the shaft, a second substantially horizontal shaft arranged within the hopper above the first-named shaft, intermediate spiral vane sections mounted upon the second shaft above and adjacent to the intermediate shields, end spiral vane sections mounted upon the second shaft above and adjacent to the end shields, and means to rotate the second shaft.

THURMAN T. SCOTT.

REFERENCES CITED

The following references are of record in the file of this patent:

UNITED STATES PATENTS

| Number | Name | Date |
| --- | --- | --- |
| 135,846 | Reames | Feb. 11, 1873 |
| 823,242 | Waterman | June 12, 1906 |
| 1,203,000 | Hoberecht | Oct. 31, 1916 |
| 1,566,808 | Baker | Dec. 22, 1925 |
| 2,038,299 | Kohlhagen | Apr. 21, 1936 |
| 2,193,373 | Munro | Mar. 12, 1940 |
| 2,522,693 | Stiteler | Sept. 19, 1950 |

FOREIGN PATENTS

| Number | Country | Date |
| --- | --- | --- |
| 193,883 | Great Britain | Mar. 5, 1923 |